United States Patent [19]

Vicenzi et al.

[11] Patent Number: 5,362,314
[45] Date of Patent: Nov. 8, 1994

[54] ADDITIVE MODIFIED BITUMINOUS EMULSIONS

[75] Inventors: Stephen P. Vicenzi, Edgerton, Wis.; Kenneth F. Grzybowski, Temple Terrace, Fla.

[73] Assignee: Exxon Chemical Patents, Inc.

[21] Appl. No.: 31,535

[22] Filed: Mar. 15, 1993

Related U.S. Application Data

[63] Continuation-in-part of Ser. No. 898,159, Jun. 15, 1992, Pat. No. 5,224,990.

[51] Int. Cl.$^5$ .............................................. C08L 95/00
[52] U.S. Cl. ........................... 106/284.06; 106/284.4; 106/277
[58] Field of Search ............... 106/277, 284.06, 284.4

[56] References Cited

U.S. PATENT DOCUMENTS

| | | | |
|---|---|---|---|
| 2,375,653 | 5/1945 | Holmes | 106/284.4 |
| 2,389,680 | 11/1945 | Mikeska | 106/284.4 |
| 2,721,807 | 10/1955 | Rendall et al. | 106/284.4 |
| 2,844,599 | 7/1958 | Rendall et al. | 106/284.4 |
| 3,056,818 | 10/1962 | Werber | 260/410.6 |
| 3,159,976 | 12/1964 | Brandt et al. | 61/36 |

(List continued on next page.)

OTHER PUBLICATIONS

Asphalts and Allied Substances–Their Occurrence, Modes of Production Uses in the Art and Method of Testing by Herbert Abraham—5th Edition; 2 volumes—vol. 1, Raw Materials and Manufactured Products, 1945, no month.

*Primary Examiner*—Helene Klemanski
*Attorney, Agent, or Firm*—Jansson & Shupe, Ltd.

[57] ABSTRACT

This invention is directed to an improved clays-stabilized bituminous emulsion composition for use as a surface coating and the like. Such an emulsion includes about 90.0–99.95 parts by weight of an aqueous bituminous emulsion and about 0.05–10.0 parts by weight of a cohesion promoting additive selected from the group consisting of amines, amidoamines and blends thereof having the structural formula $$X \cdot [R(NH\ R'')_n NH_2] + Y \cdot [R'''C(O)\ (NH_m R^{IV})_o]$$

wherein
X and Y are weight percentages such that $X + Y = 100\%$ of the active, nitrogenous components,
R is a lipophile selected from the group consisting of R'—and
R'OR"—,
R' is an alkyl chain having 3–26 carbon atoms,
R" is a hydrocarbon fragment 2–6 carbon atoms,
n is an integer from 0–4,
R''' is selected from the group consisting of an alkyl chain having 3–26 carbon atoms, and an alkenyl chain having 3–44 carbon atoms, and
$R^{IV}$ is selected from the group consisting of $\mathrm{+CH_2CH_2NH]_oH}$,

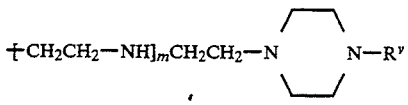

and, other poly-(ethyleneamine) based products with bottoms,
o is an integer from 1–6
m is an integer from 0–1, and
$R^V$ is selected from the group consisting of $\mathrm{+CH_2CH_2-NH]_nH}$, and H such that the resultant coating exhibits increased resistance to trafficking and water and increased cohesion. The amine is selected from the group consisting of polyamines and ether amines.

25 Claims, No Drawings

U.S. PATENT DOCUMENTS

| | | | |
|---|---|---|---|
| 3,457,090 | 7/1969 | Sor et al. | 106/284.06 |
| 3,816,483 | 6/1974 | Werdehausen et al. | 260/404 |
| 3,895,172 | 7/1975 | Jones | 106/284.4 |
| 3,928,061 | 12/1975 | Hellsten et al. | 106/284.4 |
| 4,007,127 | 2/1977 | Smadja et al. | 252/311.5 |
| 4,032,355 | 6/1977 | McLaughlin et al. | 106/284.4 |
| 4,032,550 | 6/1977 | White et al. | 260/410.6 |
| 4,043,941 | 8/1977 | White et al. | 252/430 |
| 4,447,269 | 5/1984 | Schreuders et al. | 106/277 |
| 4,462,840 | 7/1984 | Schilling et al. | 106/277 |
| 4,464,285 | 8/1984 | Schilling | 252/311.5 |
| 4,464,286 | 8/1984 | Schilling | 252/311.5 |
| 4,496,474 | 1/1985 | Reck | 106/284.4 |
| 4,561,900 | 12/1985 | Brovard et al. | 106/284.4 |
| 4,724,245 | 2/1988 | Lalanne et al. | 524/61 |
| 4,895,600 | 11/1990 | Chang et al. | 106/284.1 |
| 5,120,777 | 6/1992 | Chaverot et al. | 106/284.4 |

ADDITIVE MODIFIED BITUMINOUS EMULSIONS

This is a continuation-in-part of application Ser. No. 07/898,159, filed Jun. 15, 1992 now U.S. Pat. No. 5,224,990.

FIELD OF THE INVENTION

This invention is related generally to bituminous emulsions for industrial coatings, pavement sealers and the like, and, more particularly, to asphalt and coal tar emulsions of the type stabilized with mineral colloids which exhibit increased resistance to trafficking and water.

BACKGROUND OF THE INVENTION

Typical bituminous emulsions contain coal tar or asphalt, mineral colloids, water and additives. In coal tar emulsions, the coal tar composes approximately 35% of the emulsion. It is principally used due to its ability to protect against gasoline, kerosene and oil spills. It also imparts the desired black color when cured. The mineral colloids compose approximately 15% of a coal tar emulsion. Preferably, the mineral colloids are clays such as a ball clay or an attapulgite clay. These so-called "colloidal clays" have many of the chemical and physical properties necessary to suspend the bitumen in the aqueous phase, providing the emulsion with the consistency and stability desired.

In asphalt emulsions, asphalt composes up to approximately 50% of the emulsion. The clay composes up to approximately 30% of such an emulsion.

Additionally, fillers may be added. These fillers may be defined as bulking agents which stabilize the composition after application, or fibers which may absorb the aqueous phase and/or provide reinforcing properties. Such fillers are also added for economy, shrinkage control, to impart anti-skid properties to the final coating product and increase wear or durability of the final coating product. Examples of such fillers include sand, mica, ground slate, diatomaceous earth, ground limestone, wollastonite, perlite, cellulose fibers, talc, ground coal slag, and synthetic fibers. Fillers are typically added as needed to provide the desired bulking and gel properties for the emulsion composition.

It has also been common to include additives in the emulsions to improve the performance of the emulsions. These additives can be used to provide various results, including decreasing curing times, enhancing color of the cured film, increasing or improving the suspension of fillers, improving weatherability, improving gasoline, oil and chemical resistance, improving resistance to trafficking and water, improving filler bonding and providing longer lasting films.

The additives currently on the market to improve the suspension and bonding of fillers are primarily latex/polymer additives including acrylonitrile butadiene based polymers, neoprenes and vinyl acetates. These additives are normally sold to the contractor market through the manufacturer of the emulsion. Commonly, the contractor will dilute the coal tar emulsion with water and add the recommended level of additive to this diluted emulsion. This addition of water and additive is either done at the contractor's home office or at the job site. The emulsion is then either sprayed, squeegeed, or roller applied to the surface to be coated.

A number of significant problems stem from the use of these latex/polymer additives. While such additives may improve the suspension of sand in the emulsion they remain water susceptible in the cured coating. Because these latex/polymer additives remain water susceptible they are easily re-emulsified when applied on damp surfaces or when in contact with water prior to or after fully being cured. This results in poor traffic resistance, easy removal of the coating, peel up of the coating, overall poor wear resistance and release of the filler component of the coating.

These failures are of major concern as many of these coatings are applied to damp surfaces or are exposed to moisture, particularly rainfall prior to or after being fully cured. These coatings are often used on airport pavement where the problems associated therewith result in damage to plane engines and overall safety concerns due to lack of coating durability and skid resistance.

Another problem associated with latex/polymer additive modified bituminous emulsions of the prior art is the possibility of shocking the emulsion upon addition of the latex/polymer additive. Such a shock results in agglomeration and uneven distribution of the additive—the additive floats to the surface and creates localized thickening. To avoid the problem of shocking the emulsion, it is necessary to dilute the additives of the prior art with water prior to addition to the emulsion. Such a procedure requires time consuming additional steps.

Additionally, the additives of the prior art can become expensive to use in such emulsions. Traditionally, manufacturers suggested the use of 2 to 4 gallons of latex additive per 100 gallons of coal tar emulsion concentrate and 30 to 50 gallons of water. Additionally, 300 to 500 pounds of silica sand is commonly added to these emulsions. Such a large amount of additive increases the cost of the overall coating. Further, in order to provide a "thicker" coating and give better wear resistance manufacturers of latex additives have been recommending that the sand loading in the emulsion be increased with a corresponding increase in latex additive. Such increased sand loading and increased use of the latex additives has resulted in even worse failure of such coatings because of the increased latex additive which is water susceptible.

In summary, a considerable number of drawbacks and problems exist in the art relating to clay-stabilized bituminous emulsions. There is a need for an improved emulsion composition resulting in a coating exhibiting improved resistance to trafficking and water and improved cohesion.

OBJECTS OF THE INVENTION

It is an object of this invention to provide an improved mineral colloid-stabilized bitumen emulsion composition, overcoming some of the problems and shortcomings of the prior art.

Another object of this invention is to provide improved stabilized bituminous emulsions exhibiting increased filler bonding or cohesion and suspension.

Another object of this invention is to provide an emulsion composition wherein the additive is not water susceptible.

Another object of this invention is to provide an emulsion composition wherein the traffic resistance is increased thereby resulting in longer lasting coatings.

These and other important objects will be apparent from the descriptions of this invention which follow.

SUMMARY OF THE INVENTION

This invention is an improved mineral colloid-stabilized bituminous emulsion composition for use as a surface coating and the like. This invention overcomes certain well-known problems and deficiencies, including those outlined above. An important aspect of this invention is an improved cohesion promoting additive, including a preferred blend of amine and amidoamine, which results in improved resistance to trafficking and water while also improving thickening of the emulsion. The inventive composition allows addition of the additive directly to an aqueous emulsion of clay and bitumen, to which a filler such as sand has been added, to give a homogenous, stabilized emulsion with the desired viscosity and stability without significant additional mixing as well as improved resistance to trafficking and water of the resultant coating and improved cohesion. Such addition results in greater efficiency and lower production costs as well as overall better performance of the resultant coating. The additive of this invention not only increases the resistance to trafficking and water of the cured coating but also aids in keeping the bitumen, clay and sand in suspension.

The invention is a clay-stabilized bituminous emulsion surface-coating composition including about 90.0-99.95 parts by weight of an aqueous bituminous emulsion, and about 0.05-10.0 parts by weight of a cohesion promoting additive selected from the group consisting of amines such as polyamines or ether amines, amidoamines, and blends thereof having the structural formula

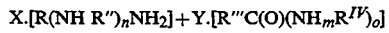

wherein
X or Y is a weight percentage, such that X+Y=100% of the active, nitrogenous components,
R is a lipophile selected from the group consisting of R'- and R'OR"-,
R' is an alkyl chain having 3-26 carbon atoms,
R" is a hydrocarbon fragment having 2-6 carbon atoms,
n is an integer from 0-4,
R''' is selected from the group consisting of an alkyl chain having 3-26 carbon atoms, an alkenyl chain having 3-44 carbon atoms, or a polyalkenyl chain having 3-44 carbon atoms,
$R^{IV}$ is selected from the group consisting of

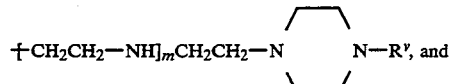

and, other poly-(ethyleneamine) based products with bottoms,
o is an integer from 1-6
m is an integer from 0-1, and
$R^V$ is selected from the group consisting of

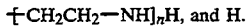

DETAILED DESCRIPTIONS OF THE PREFERRED EMBODIMENTS

The present invention is directed to an improved clay-stabilized bituminous emulsion composition for use as a surface coating and the like and the process for making it. The bituminous emulsion of the invention exhibits improved cohesion characteristics resulting in increased resistance to trafficking and water of the cured coating as well as increased filler bonding and suspension thereby improving the overall thickness of the emulsion. The process involves blending an aqueous bituminous emulsion with a cohesion promoting additive. The cohesion promoting additive is selected from the group consisting of amines, amidoamines and blends thereof.

The amines have a structural formula of

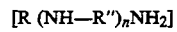

wherein
R is a lipophile selected from the group consisting of R'- and R'OR"-,
R' is an alkyl chain having 3-26 carbon atoms and is branched or linear, R" is a hydrocarbon fragment having 2-6 carbon atoms and n is an integer from 0-4.

The amidoamines have a structural formula of:

$[R'''C(O)(NH_m R^{IV})_o]$ wherein
R''' is an alkyl chain having 3-26 carbon atoms or an alkenyl chain having 3-44 carbon atoms or a polyalkenyl chain having 3-44 carbon atoms, $R^{IV}$ is

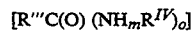

or any other poly(ethyleneamine) based products with bottoms or heavys, o is an integer from 1-6, m is an integer from 0-1 $R^V$ is either $[CH_2CH_2-NH]_n H$ or H. Bottoms or heavys of the amines are defined as materials remaining after distillation of lower boiling polyamines, having boiling points in excess of 340° C.

A blend of the amine and the amidoamine used to form the additive has the structural formula

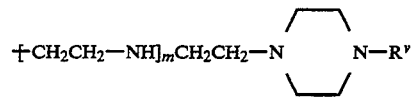

wherein
X and Y equal a weight percentage, such that X+Y=100% of the active, nitrogenous components.
X equals 0-100 and
Y equals 100-0

The additive can include 0 to 100 parts by weight amine and 0 to 100 parts by weight amidoamine. The preferred range of the blend of amine and amidoamine is 70 to 80% amine to 20 to 30% amidoamine.

The amine can be a polyamine or an ether amine. The polyamine can be a fatty amine, a diamine, a triamine or a tetramine. In a preferred embodiment the polyamine is a fatty amine such as tallow triamine. The ether amine can be an ether mono amine, an ether diamine, an ether triamine or an ether tetramine. In a preferred embodiment the ether amine is an ether triamine.

In one embodiment, where the amine is an ether amine, the lipophile is alkoxyalkyl having an R' portion of 10–13 carbon atoms in a branched configuration.

In one embodiment, the amidoamine is the amidation reaction product of tall oil fatty acid (TOFA) and aminoethylpiperazine having the structural formula:

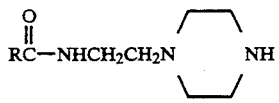

wherein
R is an alkylamine (R') or an alkoxyalkylamine R'OR",
R' is a alkyl chain having 3–26 carbon atoms and
R" is a hydrocarbon fragment having 2–6 carbon atoms.

TOFA is commonly available from Arizona Chemicals of Panama City, Fla.

In another embodiment, the amidoamine is an amidation reaction product of TOFA and triethylenetetramine. Such an amidoamine has the structural formula

wherein
R is an alkylamine (R') or an alkoxyalkylamine (R'OR"),
R' is an alkyl chain having 3–26 carbon atoms and
R" is a hydrocarbon fragment having 2–6 carbon atoms.

Alternatively, it is possible to react bottoms of tall oil fatty acids, which include blends of greater than 1–2% rosin acid, and/or greater than 1–2% of so called "unsaponifiables".

The bitumen component of the emulsion composition may be selected from the group consisting of coal tar and asphalt. Colloidal clay is selected from the group consisting of bentonite, ball, and kaolin clays. In addition, any one of these three clays may be combined with attapulgite clay.

In preferred embodiments, the ratio of bitumen to clay is at least 1:1. Overall, preferred embodiments are 20–80 parts by weight bitumen and clay and 20–80 parts water including the filler component. In highly preferred embodiments, the bituminous emulsion is 25–55 parts by weight bitumen and colloidal clay and 45–75 parts water.

Completing the emulsion composition of this invention, is approximately 0.05–10.0 parts by weight additive. The most preferred range of additive is about 0.3–2.0 parts by weight.

The method of this invention begins with a preformed aqueous emulsion of clay and a bitumen selected from the group consisting of coal tar and asphalt. Subsequently, about 0.05–10.0 parts by weight of the additive is added to about 90.0–99.95 parts by weight of the preformed emulsion and dispersed therein.

As previously noted, clay-stabilized bituminous emulsion compositions and methods for producing them, as revealed through this invention, have certain advantages, most of which relate directly to the use of the additive. Used as liquids, the additives of this invention are easily added to pre-blended bituminous emulsions, with a minimum of stirring. The additive of amine, amidoamine or blends thereof is directly added to the composition, without the necessity of first diluting the additive to prevent shock to the emulsion. As liquids, these additives are dispersed easily and rapidly throughout the emulsion medium. The final, stable viscosity is achieved quickly. These attributes promote efficiency and represent a cost-savings over the preparation of emulsions of the prior art which utilize latex based polymers.

To improve handling characteristics of some of the inventive additives a solvent such as alcohol or mineral spirits or any other solvent known to one of ordinary skill in the art may be used to improve the liquidity of the additive. Such a solvent should not interact with the coating. Alcohols commonly used include ethylene glycol, n-butanol, ethanol, isopropyl alcohol or any other alcohol known to one of ordinary skill in the art.

Without the risk of agglomeration and retention of hygroscopic activity, common with use of thickeners of the prior art, films produced from emulsion compositions of this invention do not re-emulsify, but have excellent water-resistance, a property required of outdoor surface coatings exposed to heavy or reoccurring moisture conditions.

The cohesion promoting additives of the invention, including the most preferred blends of the amine and amidoamine, are synthetic reagents which do not support the growth and proliferation of bacteria or fungi, as do cellulose and latex additives of the prior art. As such, biocides need not be added to the final emulsion product to protect the integrity and stability of an applied coating. Inasmuch as biocides of this sort are relatively expensive, deleting them affords a considerable cost-savings when compared to the prior art.

The bituminous emulsions discussed herein are essentially combinations of either asphalt or coal tar with a mineral colloid stabilizer in water. The mineral colloid is preferably clay. The amount of additive required and its performance are functions of the quantity of bituminous and clay particles present. The additives may be used at low concentrations even with high levels of bitumen and clay to provide high viscosities and good cohesion characteristics. This feature represents a source of cost-savings over latexes/polymers of the prior art, which because of their mode of function must be used in amounts proportional to the concentration of bitumen, clay and sand.

Traditionally, the coal tar emulsions of the prior art have required the use of approximately 2 to 4 gallons of latex additive per 100 gallons of coal tar emulsion concentrate, 30 to 50 gallons of water and 300 to 500 pounds of silica sand to achieve the desired results. Emulsions containing the cohesion promoting additive of this invention require the use of only about ½ to 1 gallon of additive for the same composition.

In preferred embodiments of this invention, the bentonite, ball, attapulgite or kaolin clays used are principally produced and distributed by the Kentucky-Tennessee Clay Company, Evans Clay, the American Colloid Company, the Floridan Company, H. C. Spinks and Engelhard, among others. These clays are selected, sized, and processed to provide a thick, consistent clay slurry for use in emulsion preparation. When emulsified with bitumen, clays of this type surround the bituminous particles, minimizing the potential for phase separation. Attapulgite clays may also be used in combination with those mentioned above, and are specially-sized and processed gelling clays suitable for thickening coal tar- or asphalt-based emulsions. Attapulgite clays are available through the Engelhard Corporation, Oil Dri Corporation, and the aforementioned Floridan Company.

The coal tar emulsions best used in this invention may be standard coal tar emulsions used to seal asphalt pavements or standard coal tar emulsions with fillers such as sand or coal slag added to provide crack-filling and anti-slip properties. The asphalt emulsions used in this invention are those similar to ASTMD-977 types, containing suitable fillers and additive to function like a suitable R-P-355E coal tar emulsion (coating for bituminous pavements).

In the emulsion compositions of this invention the ratio of bitumen to clay is approximately 1:1, although lower ratios may pertain to emulsions using asphalt. Increasing the proportion of clay with respect to bitumen produces an emulsion which tends to be flaky, gray in color and has reduced weather-resistance. The upper end of the relative bitumen concentration is reached at the point where the cured emulsion is tacky, soft and prone to deformation by traffic.

Bitumen and colloidal clays are preferably 20–80 parts by weight of a bituminous emulsion, the remainder essentially water. More dilute aqueous emulsions do not adequately prohibit the settling of the bitumen, clay, or whatever fillers may be present. More concentrated aqueous emulsions become too viscous for use with the emulsion compositions of this invention. The highly preferred range of combined bitumen and colloidal clay is 25–55 parts by weight of the bituminous emulsion.

The emulsions of the type discussed herein may include various minor chemical constituents, including but not limited to emulsifiers which function in the bitumen milling process. Such additives serve to aid attrition, only, by reducing bitumen surface tension and allowing the break-up of coal tar or asphalt particles.

While clay and additive provide the primary gel network for linkage to the bituminous particles, fillers may also be used. Fillers, as so defined, may be bulking agents which stabilize the composition after application, or fibers which absorb the aqueous phase and provide reinforcing properties. Such fillers are also added for economy, shrinkage control and to impart anti-skid properties to the final coating product. Examples include sand, mica, ground slate, diatomaceous earth, ground limestone, wollastonite, perlite, cellulose fibers, talc, ground coal slag, and polyolefin fibers. Fillers are typically added as needed to provide the desired bulking and gel properties for the emulsion composition.

Such fillers and the emulsions in which they are dispersed and suspended are to be distinguished from crushed stone aggregate and the like used in conjunction with asphalt pavement compositions. Likewise, the clay component of a bituminous emulsion applicable to this invention does not function as an aggregate. As stated more thoroughly above, clay emulsifies the coal tar, thereby stabilizing the aqueous emulsion.

PREPARATION OF THE COMPOSITIONS

A number of factors must be considered when preparing compositions in accordance with this invention. Among these are the relative amounts of bitumen and clay, the types of bitumen and clay, the ratio of bitumen to clay, the presence and type of fillers, the presence of emulsifiers or other chemicals, the exact type of cohesion promoting additive to be used, the nature of the process equipment available, the order of addition, and mixing times required.

While the processing steps are not critical and considerable variation is possible, certain blending procedures are preferred. However achieved, thorough and complete dispersion of the cohesion promoting additive throughout the emulsion is essential.

A preferred procedure involves adding the additive to the desired emulsion prior to sand and dilution water addition and mixing thoroughly. Gelling is initiated almost immediately as the additive interacts with the bitumen and clay particles.

Determining the optimum additive concentration is critical. The optimum is considered the least amount that provides the desired gel characteristics, including excellent gel stability and improved water sensitivity and improved trafficking resistance, and depends primarily on the specific additive used. No less important is the composition of the emulsion, taking into consideration the content and type of bitumen and clay, and the presence of any fillers or emulsifier chemicals. An optimum additive concentration must be determined for each emulsion composition.

The most straight-forward way to determine the optimum concentration of a particular additive thereof is to prepare a series of emulsions having a constant mix of clay and bitumen, varying the additive concentrations at 0.1, 0.2, 0.4, 0.8, 1.6, and 3.2 weight percents, and observing the resultant viscosity and gel stability. The concentration may then be varied in smaller increments, within what is considered to be an acceptable range, to fine-tune the desired gel strength. Relative levels of clay and bitumen may also be varied once the additive concentration range is narrowed to determine maximum gel strength. Gel characteristics should be monitored at periodic intervals after mixing (such as 24, 48 hours, 1 week, 2 weeks) under conditions of constant temperature and pressure.

It was experimentally determined that the gel strength is proportional, but not directly so, to additive concentration. As is often observed, gel strength increased at a rate greater than expected for a direct correlation. For example, doubling the amount of additive typically more than doubled gel strength, as measured by viscosity and/or consistency. However, within a relevant range, upon reaching a high end concentration, additional additive reduced overall gel strength.

Gel characteristics are determined with a standard Brookfield viscometer for liquid shear-susceptible type materials, but may also be determined by other comparable viscosity-measuring instruments. For thicker paste-like emulsions, the Brookfield viscometer with a helopath attachment should be used.

The procedures for determining gel characteristics will not be discussed, at length, but are well-known to those skilled in the art. The recommended ASTM test procedures are preferred, in particular those outlined by ASTMD244, D856 and D2196. However, any reliable test procedure will be acceptable, if properly used. Testing and evaluation is highly recommended because it is possible, although unlikely, an unforeseen chemical incompatibility may exist, in conjunction with any bitumen emulsifier used or if a latex additive is present.

The range of concentrations tested need not be broad, but should preferably be within 0.10–3.20 parts by weight. Once the optimum concentration is established for a particular bitumen emulsion, it may be used with confidence in production of other similar emulsion compositions of this invention.

With regard to the testing done to determine the resistance to trafficking and water of various bituminous emulsions, many manufacturers use an ASTM paint scrub test which measures the wet abrasion and scrub resistance of latex paints. The standards for this test were modified by adding 750 grams of weight, using a brass bristled brush versus a nylon brush, as is called for in the paint scrub test and soaking the cured film for 24 hours prior to running the test. These measures were taken to accelerate the test. A ceramic tile was chosen to be used as the substrate. Ceramic tile was chosen as this is the same substrate specified in RP355E specifications for kerosene and fuel resistance testing. This specification also calls for a one hour water soak of the tile prior to testing. This protocol was incorporated into the scrub testing.

The test was run in two forms, a dry scrub and a wet scrub. The dry scrub involved filling a trough full of water with a brush as described above, disposed thereabove which moves back and forth in a cycle across the coating. In the dry scrub test, a ceramic tile was soaked for one hour in water. The emulsion was then applied with a draw down bar to insure an even coating. The plates were then cured for 48 hours. Normally, testing was done with three tiles at once. The three tiles are attached to a piece of aluminum or other suitable metal to hold the three tiles in place. One tile was treated with an emulsion modified with the additive of the present invention, one tile was treated with an emulsion modified with a latex based additive of the prior art and one tile was coated with a control bituminous emulsion which included no additive. The entire plate containing three ceramic tiles was then submerged in the water trough and the test was immediately run. The test was run until greater than or equal to 75% of the coating was worn away as determined by observation and measurements. The number of cycles was noted. If no failure occurred, the test was terminated after one full day of testing which was approximately 15,000–22,000 cycles.

With regard to wet scrubs, the only difference in the wet scrub is that coatings after application to the three tiles were soaked in the water trough for 24 hours after being cured for 48 hours. The test was then immediately run in a similar manner as described above.

Several various examples with comments regarding scrub resistance and failure time are discussed below.

EXAMPLE 1

| Ingredient | Coal Tar Emulsion W/Additive of Invention | Control Without Additive |
| --- | --- | --- |
| Coal Tar Emulsions (51.8% Solids) | 57.9 pts | 56.9 pts |
| Water | 18.5 pts | 19.6 pts |
| Additive of Invention | 0.2 pts | None |
| Sand 30/45 grade | 23.4 pts | 23.5 pts |

The emulsion, with 0.2 parts of the additive of invention by total formula 0.4 parts by parts of Coal Tar Emulsion, exhibited a viscosity increase of 3300 cps (Brookfield, #4 spindle, 20 rpm @25° C.), versus 1300 cps for the Control with no additive. The additive modified formula also withstood 2500 scrub cycles compared to 21 cycles for the Control.

EXAMPLE 2

Another example compares the additive modified formula of the invention with a latex additive, FSA, used by the industry and distributed by Maintenance, Inc., Ohio.

| Ingredient | Emulsion with Additive of Invention | Emulsion with Prior Art Latex Additive |
| --- | --- | --- |
| Coal Tar Emulsion (51.8% Solids) | 57.9 pts | 56.9 pts |
| Water | 18.5 pts | 18.2 pts |
| Additive of Invention | 0.2 pts | None |
| Sand 30/45 grade | 23.4 pts | 23.5 pts |

The FSA treated coal tar emulsion displayed a viscosity increase to 1750 cps versus 3300 for the emulsion containing the additive of invention. The additive of invention was dosed at 1/7th the concentration of the FSA. The wear resistance of the additive of invention was 2500 cycles, compared to less than 5 cycles for the FSA treated formula

EXAMPLE 3

Another example displayed the superior sand-holding power of the additive of invention versus a well-recognized acrylonitrile-butadiene based additive of the prior art (Tarmax R-100), used to enhance sand retention. The additive of invention was added at 1.5 weight percent versus 3.0 weight percent for the acrylonitrile based additive, based on the coal tar emulsion weight with sand addition. Sand was added at a rate of 3 lbs/gallon of coal tar emulsion. The representative mixes were applied to ceramic tiles at 15 wet ml, cured for 96 hours, and submitted to the scrub test. The results:

| # Scrub cycles | w/1.5 wt % Additive of Invention | w/3.0 wt % Tarmax R-100 |
| --- | --- | --- |
| 2300 | No Effect | No Effect |
| 3400 | No Effect | 45% Loss |
| 5600 | No Effect | 100% Loss |

EXAMPLE 4

Still another example displays the improved water sensitivity and wear resistance at cold temperatures. A coal tar emulsion manufactured with alternate raw materials was used. The coal tar emulsion contained 2 lbs/gallon of sand. Films of 30 wet ml were prepared on ceramic tiles, allowed to cure 48 hours and scrubbed in 45° to 55° F. water. The results are shown below.

| # Scrub Cycles | w/0.4 wt Additive of Invention | w/0.8 wt % Tarmax R-100 | Control |
| --- | --- | --- | --- |
| 5000 | No Effect | No Effect | 10% Loss |
| 7500 | No Effect | 15% Loss | 55% Loss |
| 10,500 | No Effect | 55% Loss | 100% Loss |
| 12,600 | No Effect | 100% Loss | |

The above example highlights the benefits of the additive of invention compared to no additive, and Tarmax R-100 of latex additive, at a higher dosage level, after adequate curing, with no water conditioning, but evaluated at colder temperatures.

EXAMPLE 5

Another example displays the same formulas cured for 48 hours, but subjected to a 24-hour distilled water bath before testing.

PART 1

| # Scrub Cycles in 45-55° F. H$_2$O | w/0.4 wt % Additive of Invention | w/0.8 wt % Tarmax R-100 | Control |
|---|---|---|---|
| 20 | No Effect | No Effect | 5% Loss |
| 50 | No Effect | 50% Loss | 45% Loss |
| 75 | No Effect | 80% Loss | 65% Loss |
| 105 | No Effect | 90% Loss | 100% Loss |
| 137 | No Effect | 100% Loss | |
| 500 | No Effect | | |
| 1000 | No Effect | | |

PART 2

| # Scrub Cycles in 75-80° F. H$_2$O | w/0.4 wt % Additive of Invention | w/0.8 wt % Tarmax R-100 | Control |
|---|---|---|---|
| 25 | No Effect | 60% Loss | No Effect |
| 70 | No Effect | 100% Loss | No Effect |
| 100 | No Effect | | 40% Loss |
| 130 | No Effect | | 70% Loss |
| 160 | No Effect | | 100% Loss |
| 400 | No Effect | | |
| 800 | No Effect | | |

The second part of this example displays the susceptibility of the coal tar emulsion to wear/cohesion loss as a consequence of water soaking and increased temperature.

While the principles of this invention have been described in connection with specific embodiments, it should be understood clearly that these descriptions are made only by way of example and are not intended to limit the scope of the invention.

What is claimed:

1. In a surface-coating comprising including a clay-stabilizer bituminous emulsion, said clay present in an amount sufficient to emulsify the bitumen, the improvement comprising:
   about 90.0–99.95 parts by weight of an aqueous bituminous emulsion; and
   about 0.05–10.0 parts by weight of a cohesion promoting additive selected from the group consisting of amines, amidoamines and blends thereof having the structural formula

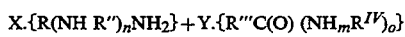

wherein
   X and Y are weight percentages, such that X+Y=100% of the active, nitrogenous components,
   R is a lipophile selected from the group consisting of R'- and R'OR''-,
   R' is an alkyl chain having 3–26 carbon atoms,
   R'' is a hydrocarbon fragment having 2–6 carbon atoms,
   n is an integer from 0–4,
   R''' is selected from the group consisting of an alkyl chain having 3–26 carbon atoms, and an alkenyl chain having 3–44 carbon atoms, and
   R$^{IV}$ is selected from the group consisting of

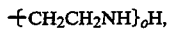

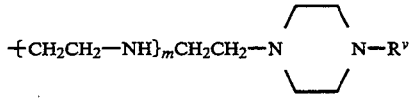

and, other poly-(ethyleneamine) based products with bottoms,
   o is an integer from 1–6
   m is integer from 0–1, and
   R$^V$ is selected from the group consisting of

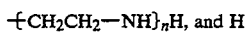

such that the resultant coating exhibits increased resistance to trafficking and water and increased cohesion.

2. The composition of claim 1 wherein the amine is selected from the group consisting of polyamines and ether amines.

3. The composition of claim 1 wherein the preferred range of the cohesion promoting additive is 0.3–2.0 parts by weight.

4. The composition of claim 1 wherein the cohesion promoting additive is a blend of 0–100 parts by weight amine and 0–100 parts by weight amidoamine.

5. The composition of claim 4 wherein the cohesion promoting additive is preferably a blend of 70–80 parts by weight amine and 20–30 parts by weight amidoamine.

6. The composition of claim 2 wherein the polyamine is selected from the group consisting of fatty amines, diamines, triamines and tetramines.

7. The composition of claim 2 wherein the ether amine is selected from the group consisting of ether mono amines, ether diamines, ether triamines and ether tetramines.

8. The composition of claim 6 wherein the polyamine is a fatty amine.

9. The composition of claim 8 wherein the fatty amine is tallow triamine.

10. The composition of claim 7 wherein the ether amine is preferably an ether triamine.

11. The composition of claim 1 wherein the amidoamine is the amidation reaction product of tall oil fatty acid and aminoethylpiperazine, said amidoamine, having the structural formula

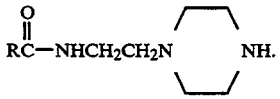

12. The composition of claim 1 wherein the amidoamine is the amidation reaction product of tall oil fatty acid and triethylenetetramine, said amidoamine, having the structural formula

13. The composition of claim 7 wherein the lipophile is alkoxyalkyl having an R' portion of 10-13 carbon atoms in a branched configuration.

14. The composition of claim 1 wherein the bitumen component of the emulsion is selected from the group consisting of coal tar and asphalt.

15. The composition of claim 1 wherein the clay is a colloidal clay selected from the group consisting of bentonite, ball, and kaolin clay.

16. The composition of claim 15 wherein the clay includes attapulgite clay.

17. The composition of claim 1 wherein the ratio of bitumen to clay is approximately 1:1.

18. The composition of claim 1 wherein the bituminous emulsion is 20-80 parts by weight bitumen and colloidal clay and 20-80 parts water.

19. The composition of claim 18 wherein the bituminous emulsion is 25-55 parts by weight bitumen and colloidal clay and 45-75 parts water.

20. The composition of claim 1 further comprising filler to provide bulk.

21. The composition of claim 1 wherein the cohesion promoting additive is diluted by a solvent.

22. In a method for producing a surface-coating composition including a clay-stabilized bituminous emulsion, the improvement comprising:
providing a pre-formed emulsion including water, clay and a bitumen selected from the group consisting of coal tar and asphalt; and
as subsequent steps adding to about 90.0-99.95 parts by weight of said pre-formed emulsion and dispersing therein about 0.05-10.0 parts by weight of a cohesion promoting additive selected from the group consisting of amines, amidoamines and blends thereof having the structural formula
X·{R(NH R'')$_n$NH$_2$}+Y·{R'''C(O) (NH$_m$R$^{IV}$)$_o$} wherein
X and Y are weight percentages, such that X+Y=100% of the active, nitrogenous components, R is a lipophine selected from the group consisting of
R'-, and
R'OR''-,
R' is an alkyl chain having 3-26 carbon atoms,
R'' is a hydrocarbon fragment having 2-6 carbon atoms,
n is an integer from 0-4,
R''' is selected from the group consisting of an alkyl chain having 3-26 carbon atoms, and an alkenyl chain having 3-44 carbon atoms, and
R$^{IV}$ is selected from the group consisting of

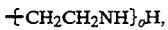
-(-CH$_2$CH$_2$NH-)$_o$H,

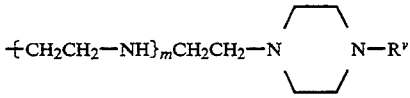

and, other poly-(ethyleneamine) based products with bottoms,
o is an integer from 1-6
m is an integer from 0-1, and
R$^V$ is selected from the group consisting of

-(-CH$_2$CH$_2$—NH-)$_n$H, and H such additive present in an amount sufficient to provide stable gel structure and a coating exhibiting improved resistance to trafficking and water and increased cohesion.

23. The method of claim 22 wherein the amine is selected from the group consisting of polyamines and ether amines.

24. The method of claim 22 wherein the preferred range of the cohesion promoting additive is 0.3-2.0 parts by weight.

25. The method of claim 22 wherein the cohesion promoting additive is preferably a blend of 70-80 parts by weight amine and 20-30 parts by weight amidoamine.

* * * * *